United States Patent [19]

Stern

[11] 3,941,609
[45] Mar. 2, 1976

[54] ZINC DUST, ITS PREPARATION, AND APPARATUS FOR PREPARING SAME
[75] Inventor: Melvin Stern, Levittown, Pa.
[73] Assignee: ASARCO Incorporated, New York, N.Y.
[22] Filed: Aug. 22, 1973
[21] Appl. No.: 390,479

Related U.S. Application Data
[63] Continuation-in-part of Ser. No. 172,806, Aug. 18, 1971, abandoned.

[52] U.S. Cl. .................................. 106/290; 106/14
[51] Int. Cl. ...................... C09c 1/04; C08h 17/04
[58] Field of Search ........................ 106/290, 14, 1

[56] References Cited
UNITED STATES PATENTS
3,130,061  4/1964  McMahon ............................. 106/84

Primary Examiner—Winston A. Douglas
Assistant Examiner—J. V. Howard
Attorney, Agent, or Firm—R. J. Drew; E. J. Schaffer

[57] ABSTRACT

Zinc dust composed of generally spherical zinc dust grains and having a grain size distribution such that at least about 98% of the grains have a grain size less than 15 microns and no more than about 3% of the grains have a grain size less than 2 microns, and especially well adapted for use in corrosion-inhibiting coating compositions where thin but effective protective coatings are desired or required. The zinc dust has a metallic zinc content of about 96%–98%. The corrosion-inhibiting coating compositions, and apparatus and method for the preparation of such zinc dust are also disclosed.

7 Claims, 9 Drawing Figures

Fig. 1.

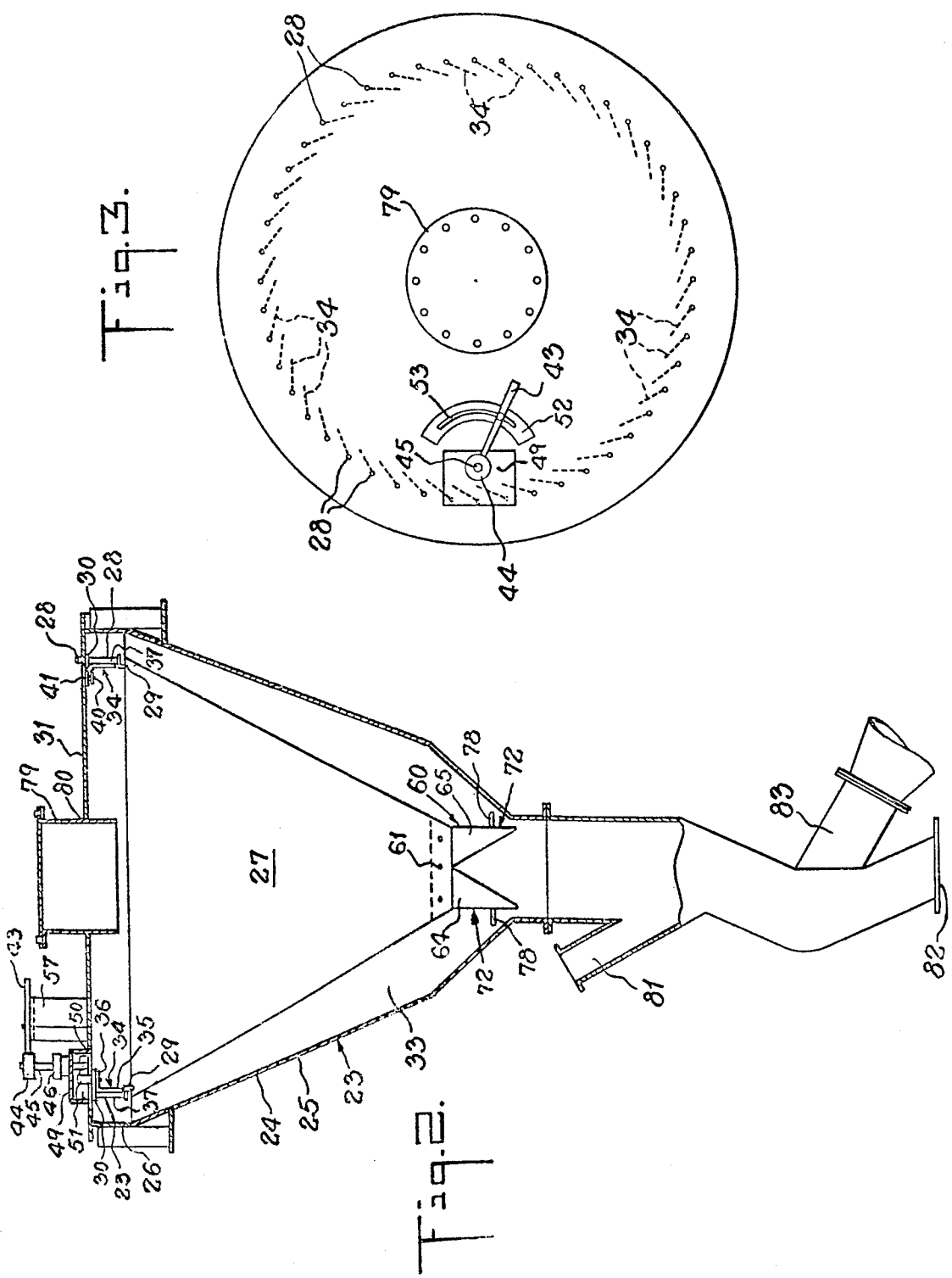

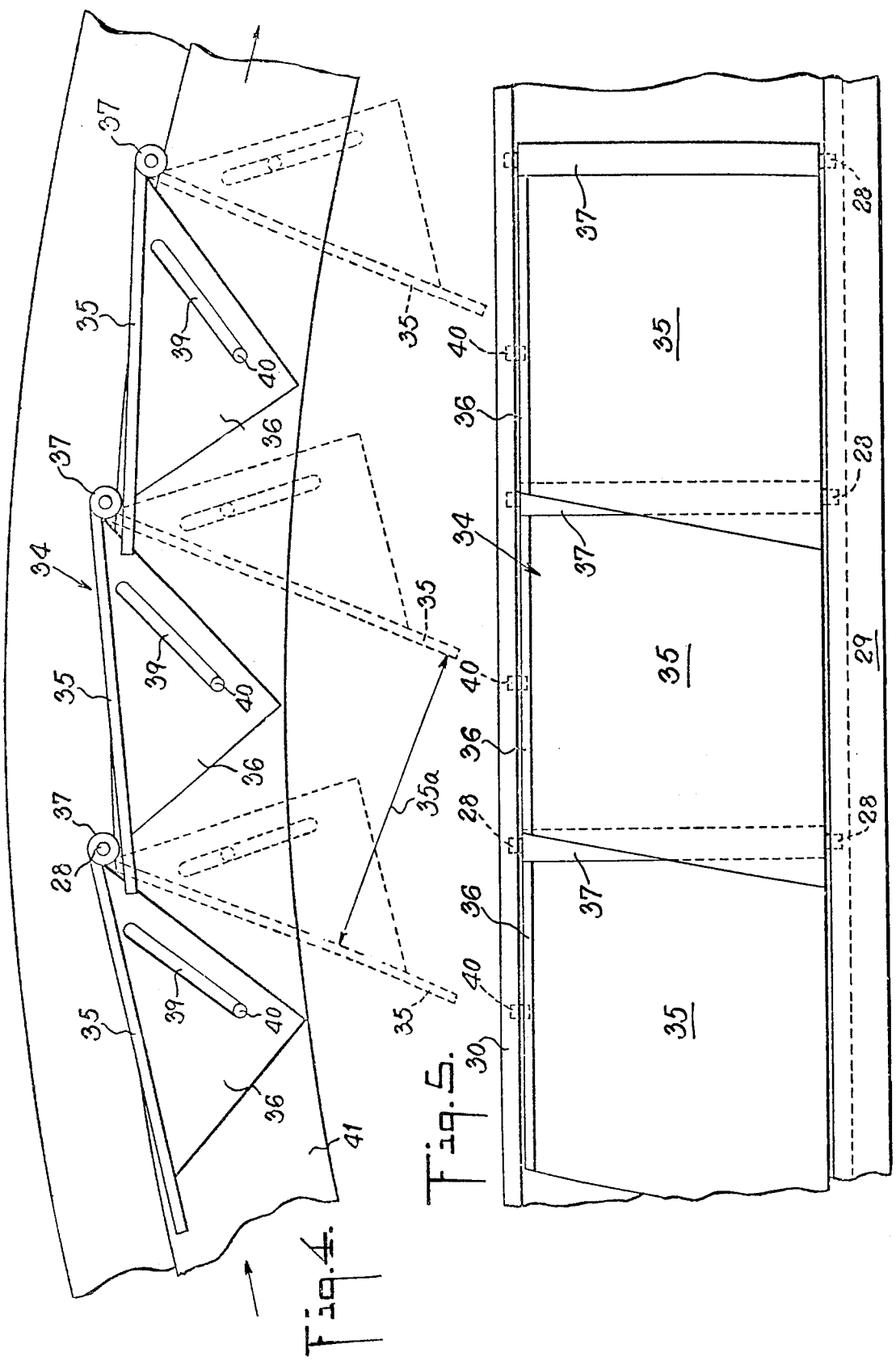

ZINC DUST, ITS PREPARATION, AND APPARATUS FOR PREPARING SAME

CROSS REFERENCES TO RELATED APPLICATIONS

This is a continuation-in-part of my co-pending application Ser. No. 172,806, filed Aug. 18, 1971, now abandoned.

BACKGROUND OF THE INVENTION

1. Field of the Invention

This invention relates to zinc dust and more particularly to a new and improved zinc dust, an apparatus and method for preparing such dust, and to a new and improved protective coating composition containing such dust.

2. Description of the Prior Art

U.S. Pat. No. 1,738,910 discloses an exceedingly fine zinc powder containing 90% metallic zinc and composed of spherical particles. U.S. Pat. No. 2,123,300 discloses a zinc dust free of metallic cadmium. A high purity, oxide-free zinc powder of extremely high purity and a spherical particle size distribution such that substantially all of the particles have a size less than about 0.1 micron is disclosed in U.S. Pat. No. 3,065,958. U.S. Pat. No. 3,288,746 discloses a lamellar zinc pigment of about 0.1 to 0.5 micron thickness and of 99.97% purity. Zinc powder having spherical particles is also referred to in U.S. Pat. No. 3,288,746. Zinc powder having a grain size on the order of 20 microns or less is disclosed in U.S. Pat. No. 3,403,229. U.S. Pat. Nos. 3,449,116 and 3,449,117 disclose zinc dust having a metallic zinc content of about 99%, and also disclose that zinc dust having a metallic zinc content greater than 98.5% tends to frit and does not flow readily. U.S. Pat. No. 3,464,906 show zinc pigment in the form of flakes and of particle size below 60 microns, for use in zinc paints destined to be deposited electrophoretically.

One important application of zinc dust is in paints or coating compositions for coating steel strip in coils to provide a sacrificial protective coating on the strip. For this application, it is important that an excessive amount of fine zinc-containing particles not be present in the zinc dust and specifically no more than about 3% by weight of the zinc dust of grain size less than 2 microns should be present inasmuch as the presence of the excessive amount of zinc finer than 2 microns is detrimental. The reason amounts of zinc dust fines appreciably greater than about 3% by weight less than 2 microns in grain size is detrimental in the zinc dust for this application, viz. the coating of the steel strip in coils, is that this portion of the zinc dust is usually the highly oxidized portion of the zinc and it tends to result in a highly viscous zinc paint which produces an unsatisfactory, non-uniform coating on the steel. Further this highly oxidized portion of the zinc dust contains undesirable, relatively high concentrations of metal impurities such as, for instance, compounds of aluminum, magnesium, silicon and copper, which result in undesirable paint films. Additionally the presence of such excessive amounts of zinc fines appreciably greater than 3% less than 2 microns results in a materially decreased electrical conductivity and a materially increased electrical resistivity in the paint film and the art has generally considered the decreased conductivity and increased resistivity to be indicative of an inferior zinc-containing protective coating on steel. Further, it is important that an excessive amount of coarse zinc dust particles not be present in the zinc dust utilized for the coating composition for coating the steel strip, for the reasons in thin paint films the coarse particles protrude above the surface of the film and are easily dislodged and pulled out by abrasive forces leaving "holidays" or voids in the paint film, enabling the corrosive fluid, for instance sea water, to contact and hence corrode the ferrous metal substrate.

To the best of my knowledge, the prior art has never come up with or produced a zinc dust having as little as about 3% by weight or less of the zinc dust grains of grain size less than 2 microns while having about 98% or more of the zinc dust grains of grain size less than 15 microns and having about a 96–98% metallic zinc content.

BRIEF SUMMARY OF THE INVENTION

In accordance with the present invention, a new and improved zinc dust is provided which constitutes a considerable improvement over the prior art zinc dust. The zinc dust of this invention is composed of generally spherical zinc dust grains, with the dust having a grain size distribution such that about 98% or more of the grains have a grain size less than 15 microns, and no more than about 3% of the grains have a grain size less than 2 microns, all percentages being by weight. The zinc dust herein has a metallic zinc content of about 96–98%. The remainder of the zinc dust is primarily zinc oxide. The zinc dust of this invention constitutes a considerable improvement in this art for the reasons: (1) yields a considerably improved zinc paint containing an organic binder for protectively coating steel inasmuch as its use in the organic binder-containing zinc paint resulted in a coating or film on the steel which exhibited entirely unexpectedly a considerably greater corrosion resistance and with a materially thinner coating or film on the steel, than when using a paint employing the prior art zinc dust having a considerably larger amount of zinc dust particles of particle size greater than 15 microns than is present in the zinc dust of the present invention and a considerably larger amount of zinc dust fines having a grain size less than 2 microns than is present in the zinc dust of this invention; (2) considerably higher metallic zinc content and in the range of about 96–98% metallic zinc content than with prior art zinc dust; (3) considerably longer life of deposited films of the zinc paint prepared utilizing the zinc dust of this invention than with prior art zinc dusts and this was also entirely unexpected and surprising; (4) a smoother coat or film is provided by the zinc paint prepared utilizing the zinc dust of this invention than that prepared utilizing prior art zinc dust containing a considerably larger amount of zinc dust perticles having a particle size greater than 15 microns; (5) capable of being relatively easily suspended in organic and inorganic binders in the preparation of paints or coating compositions; (6) virtually nonclogging to spray application equipment due to the relatively small amount of coarse zinc dust particles having a particle size greater than 15 microns in the zinc dust utilized to prepare the paint; and (7) substantially non-agglomerating in the zinc dust container due to the relatively small amount of zinc dust fines of grain size less than 2 microns.

In a specific embodiment, the new and improved zinc dust of this invention was prepared by introducing the zinc dust into the feed inlet of an operating air separator of a type having an outer casing and a smaller inner conical casing mounted within the outer casing to define an annular passageway between the sidewalls of the two casings, position-adjustable separator vanes mounted in the upper portion of the air separator above the entrance to the inner casing, and a valved discharge outlet in the lower portion of the inner conical casing, and by strictly observing the conditions, in this specific embodiment, hereafter set forth:

1. Setting and securing the separator vane blades in an open position such that a spacing of about 1½ inches is defined between adjacent separator vane vertical blades instead of the normal 2 9/16 inch spacing between such vane vertical blades employed heretofore, this about 1½ inch spacing or distance being the shortest distance measured on a straight line extending from the outer tip of the vertical blade of each vane to the closest point on the vertical blade of the next adjacent or immediately adjacent vane;

2. supplying air into the air separator in amount and at a velocity which is sufficient to (a) entrain the incoming zinc dust feed and (b) in passing between the about 1½ inch spaced separator vane vertical blades, to result in a desired outer downwardly moving vortex moving at a sufficient velocity to centrifugally throw out of the air zinc particles of 15 microns or larger size, and an inner upwardly moving smaller diameter vortex within the outer vortex; and 3. maintaining the valved outlet at the lower portion of the air separator inner conical casing tightly closed at all times during operation of the separator except during periodic discharge of coarser zinc dust particles therefrom by opening of the flapper valves. The observance of all of the conditions set forth in 1–3 immediately supra was necessary when using such air separator to prepare the new and improved dust.

The preparation method of this invention comprises the steps of:

A. Introducing the discrete dust particles of varying size including zinc dust particles having a particle size of 15 microns and larger, zinc dust grains having a grain size less than 15 microns and which may or may not contain zinc dust grains having a grain size less than 2 microns into the zinc dust inlet of the air separator of the apparatus herein.

B. Blower-or fan-driven air is introduced into the air separator in an amount and at a velocity, typically 2670 feet per minute, which is sufficient to entrain the discrete zinc dust particles introduced into the zinc dust inlet, with the amount and velocity of the introduced air also being sufficient, after passage of the entraining air-entrained zinc dust particle mixture through predetermined width spacings, which are about 1½ inches in width for obtention of the new and improved zinc herein, between open adjacent separator vane vertical blades at the air separator upper portion, to result in an outer downwardly-moving vortex moving at a velocity sufficient to throw out zinc dust particles of at least 15 microns in size and an inner upwardly moving smaller diameter vortex within the outer vortex.

C. The introduced zinc dust particles are entrained in the blower-driven air flowing at the aforesaid velocity, and the entraining air-entrained zinc dust particle mixture passes upwardly within an annular space defined by and located between the spaced apart inner conical casing and outer casing having the intermediate and lower generally conical portions of the air separator.

D. The entraining air-entrained zinc dust particle mixture is then passed at the aforesaid velocity through the predetermined width spacings defined by the open adjacent separator vane vertical blades at the air separator upper portion.

E. The entraining air-entrained zinc dust particle mixture, after passage through such predetermined width spacings, moves within the inner conical casing as an outer downwardly-moving vortex moving at a velocity sufficient to throw out, due to centrifugal force, the zinc dust particles having a particle size of 15 microns and larger, and then reverses direction and moves upwardly as an inner smaller diameter vortex within the outer downwardly-moving larger vortex.

F. The entraining air-entrained zinc dust particle mixture free or substantially free of the zinc dust particles of a particle size of 15 microns and larger is then withdrawn from the upper portion of the air separator, ordinarily by the suction of a blower or fan, and passed to a zinc dust particle separating zone.

G. The zinc dust particles are separated from the entraining air in the separating zone. The separated zinc dust particles comprise generally spherical zinc dust grains having a grain size distribution such that about 98% or more of the grains have a grain size less than 15 microns, and no more than about 3% of the grains have a grain size less than 2 microns, the separated zinc dust particles having a metallic zinc content of about 96–98%.

H. The air is returned from the separating zone, after separation of the zinc dust particles therefrom, as blower- or fan-driven air to the air separator air inlet and introduced therein in the amount and at the velocity previously disclosed herein.

I. The coarser or larger zinc dust particles of particle size of 15 microns and larger thrown out of the outer downwardly-moving vortex are collected in the lower portion of the air separator inner casing, and the flapper valves of a flapper valved-outlet for such coarser dust particles are maintained tightly closed during such collecting and open only when the weight of the collected coarse dust particles exceeds the external force thereon due to the air pressure in the lower portion of the separator below the flapper valves which otherwise force such flapper valves tightly closed.

J. The flapper valves open from time to time, and when the weight of the accumulating coarse dust particles exceeds the force holding the flapper valves tightly closed as disclosed immediately above.

The zinc dust particles of particle size larger than one-fourth inch are usually separated from the zinc dust particles of varying size from the zinc dust plant prior to introducing the zinc dust particles into the air separator zinc dust inlet, for instance by screening with, for example, a trommel screen. Any suitable separating means or screening means can be utilized, however, for separating the zinc dust particles of particle size larger than one-fourth inch from the zinc dust particles from the zinc dust plant.

The product dust grains or particles are separated from the entraining air, subsequent to the withdrawal of the entraining air-entrained zinc dust particle mixture from the air separator, in, for example, a cyclone separator or cyclonic separating zone. However any suitable separating means can be employed for separating the product zinc dust grains from the entraining air. Exemplary of separating means for this purpose, in addition to the cyclone separator referred to supra, are the bag filters utilized in the bag house of a zinc plant.

The product zinc dust in another embodiment of this invention comprises generally spherical zinc dust grains and has a grain size distribution such that about 98% or more of the grains have a grain size less than 15 microns, and no more than about 2% of the grains have a grain size less than 2 microns, the percentages being by weight. The zinc dust has a metallic zinc content of about 96 to about 98%.

In an additional embodiment of this invention, the product zinc dust comprises generally spherical zinc dust grains and has a grain size distribution such that about 98% or more of the grains have a grain size less than 15 microns, about 85 to about 93% of the grains have a grain size less than 10 microns, about 45 to about 55% of the grains have a grain size less than 5 microns, and no more than about 3% of the grains have a grain size less than 2 microns, the percentages being by weight. The zinc dust has a metallic zinc content of about 96–98%.

BRIEF DESCRIPTION OF THE DRAWINGS

FIG. 2 is a vertical longitudinal section through an air separator of the apparatus of this invention;

FIG. 3 is a top plan view of the air separator of the apparatus of this invention;

FIG. 4 is a view looking at the bottom of some of the separator vanes and a portion of the moveable and immoveable annular supporting members of the air separator of the apparatus of this invention, the separator vanes being hingedly mounted on the immoveable annular member;

FIG. 5 is a side elevation view of the separator vanes of the air separator of the apparatus of this invention;

DETAILED DESCRIPTION OF THE DRAWINGS

Figure 1:
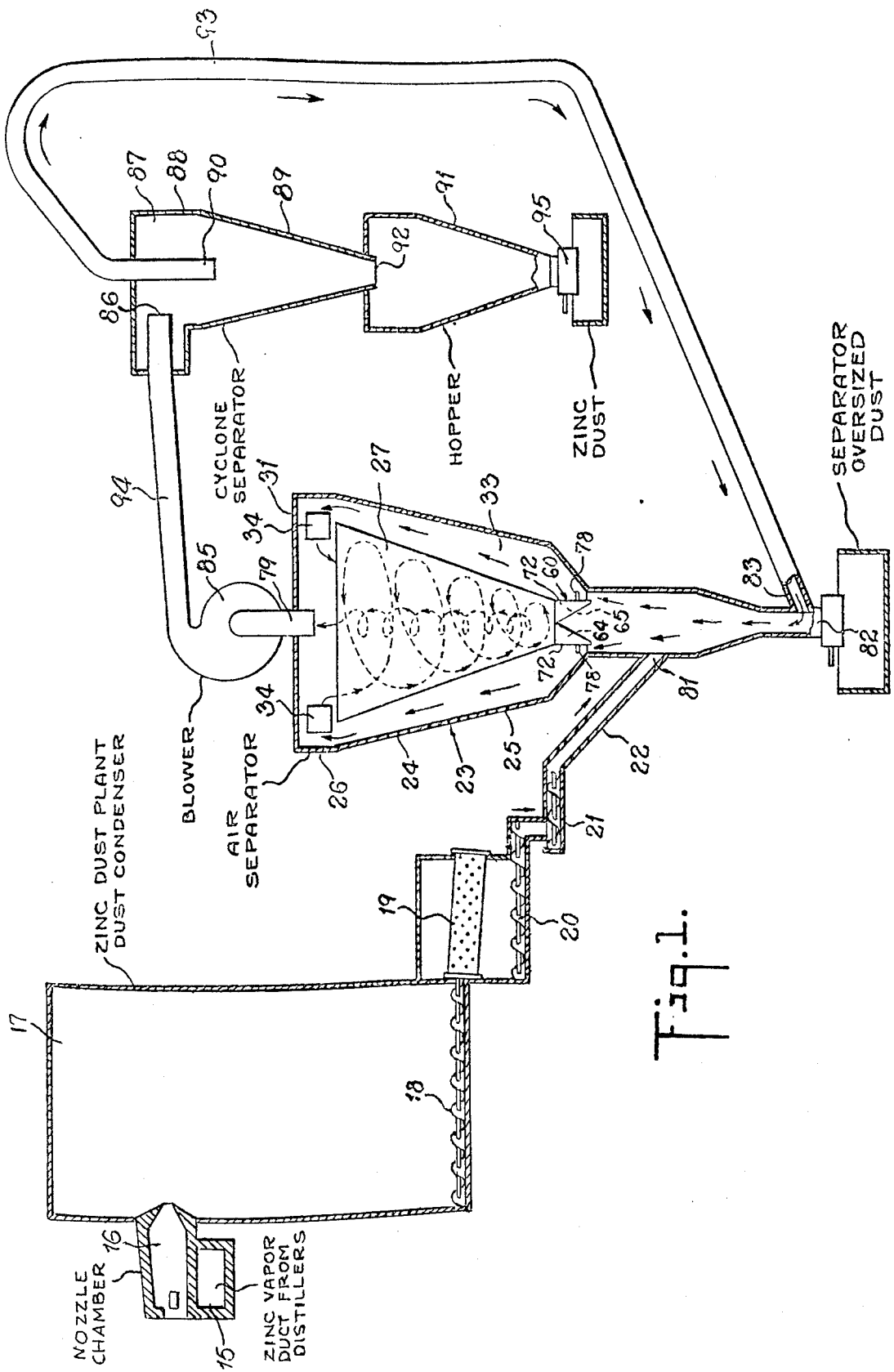
FIG. 1 is a schematic side elevation view partially in section of apparatus of the invention for preparing the new and improved zinc dust of this invention.
Figure 6:
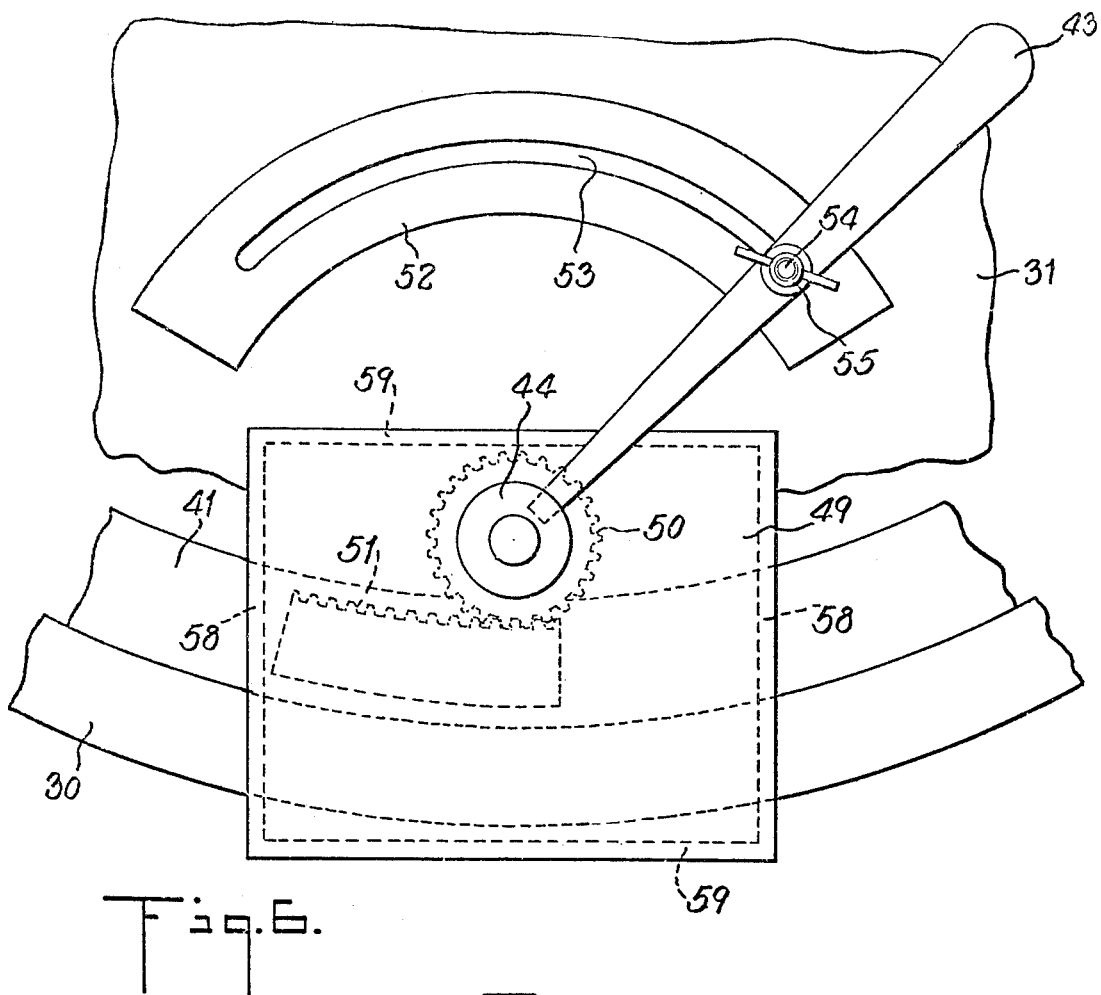
FIG. 6 is a top plan detail view of the operating mechanism including the gearing for opening and closing the separator vanes of the air separator of the apparatus of this invention.
Figure 7:
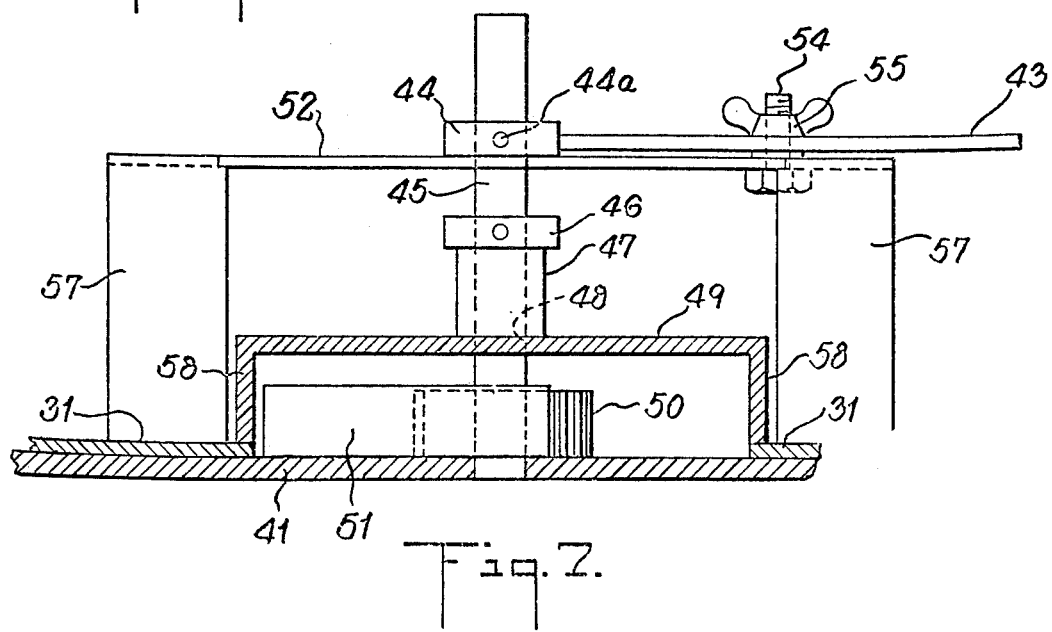
FIG. 7 is a side elevation view of the operating mechanism of FIG. 6.

With reference to FIG. 1, vapor duct 15 communicates with nozzle chamber 16 which in turn is mounted to supply zinc vapor into zinc dust condenser 17. Screw conveyor 18 at the bottom of condenser 17 moves the dust out of condenser 17 and into trommel screen 19 having ¼ inch diameter screen openings. Screw conveyor 20 is disposed directly beneath screen 19 for conveying finer zinc dust particles of a size passing through screen 19 to screw conveyor 21, the inlet end portion of conveyor 21 being located directly beneath the outlet end portion of conveyor 20. Conveyor 21 is connected to inlet duct 22 of air separator 23 for feeding the zinc dust to the inlet of separator 23 and hence into this separator.

Separator 23, shown also in FIG. 2 and in more detail in FIG. 2, has outer casing 24 including lower and intermediate conical portion 25 and upper cylindrical portion 26. Inner conical casing 27 is mounted within outer casing 24 and in spaced relationship to outer casing 24 by means of pins 28 extending through apertures in mounting brackets 29 which are welded to the upper portion of inner casing 27, pins 28 also extending through registering apertures in fixed outer ring 30 and cover 31 and being secured to cover 31 and mounting bracket 29 by nuts on threaded end portions of the pins. There are 48 of pins 28 spaced about 3 inches from one another. Annular passageway 33 is defined by and located between the outer and inner spaced casings 24 and 27 respectively.

Separator vanes 34, shown also in FIG. 3 and in more detail in FIGS. 4 and 5, each include a generally vertical blade or plate-like portion 35, shown in FIG. 5, depending from and welded to a generally horizontal triangular-shaped blade or plate-like portion 36, shown in FIG. 4. Vanes 34 are welded to and hingedly mounted on hinges 37 having hinge pins 28, pins 28 also extending through apertures in mounting bracket 29 for inner conical casing 27 and through registering apertures in fixed outer ring 30 and cover 31 as previously disclosed herein. Slot aperture 39, shown in FIG. 4, is provided in generally horizontal blade 36 of each vane 34, with the principal or longitudinal axis of slot aperture 39 forming an acute angle of typically about 34° with the plane of generally vertical blade 35. Guide pins 40, shown in FIGS. 2, 4 and 5, welded to moveable ring or annular member 41, are each of slightly smaller diameter than the width of slot aperture 39 and extend substantially perpendicular from the plane of moveable annular member 41 and project through slot apertures 39 as shown in FIG. 4 for opening and closing of the vanes 34 as is hereinafter described.

The operating mechanism for opening and closing the separator vanes 34, shown in FIGS. 2, 3, 6 and 7, includes lever or handle 43 secured to collar 44 which in turn is secured by pin 44a to partially rotatable shaft 45. Shaft 45 extends downwardly through packing gland cover 46 and packing gland 47 and is journalled through opening 48 in gear box cover 49 and extends through the central opening of pinion gear 50, pinion 50 being secured to shaft 45 and moved by its partial rotatory movement. Gear rack 51 is welded to moveable annular member 41 and meshes with pinion 50. Arcuate-shaped or curved plate 52, welded to and supported by standards 57, has arcuate-shaped slot guide opening 53 therethrough, and bolt 54 of slightly smaller diameter than the width of slot opening 53 extends through this slot opening and also through a registering aperture in lever 43. Wing nut 55 is threadably engaged on the threaded end portion of bolt 54, with wing nut 55 being tightened when it is desired to secure lever 43 in a desired location and hence the separator vanes 34 in a particular desired open position or in the closed position. End walls 58 and side walls 59 are welded to top wall or cover 49 of the gear box and also to cover 31 to form a substantially air-tight cover over the pinion and rack. When wing nut 54 is loosened sufficiently, lever 43 can be manually moved the desired distance in a generally arcuate direction whereby pinion 50 is partially rotated and hence rack 51 is moved. Consequently moveable inner annular member 41 is partially rotated the desired extent and when annular member 41 is moved in the direction of the arrows shown in FIG. 4, the movement of guide pins 40 in slot apertures 39 of generally horizontal blades 36 of separator vanes 34 causes generally vertical blades 35 of the vanes to swing open the desired extent, for example to the open positions shown by the broken lines in FIG. 4. When lever 43 is then moved in the opposite direction, moveable annular member 41 is partially rotated in the opposite direction whereby the movement of guide pins 40 in the opposite direction in slot apertures 39 of blades 36 causes generally vertical blades 35 of the separator vanes 34 to swing in the opposite direction to a less open position and ultimately, if desired, to the solid line, closed position shown in FIG. 4.

To obtain the new and improved zinc dust of this invention having the grain size distribution previously set forth herein, it was critical that the generally vertical blades 35 of separator vanes 34 be partially closed to an approximately 1½ inch spacing between the opened adjacent vertical blades 35 from the normal or usual spacing of 2 9/16 inches between the opened vertical blades 35. This about 1½ inch spacing or distance is the shortest distance measured on a straight line, shown as a broken line 35a in FIG. 4, extending from the outer tip of the vertical blade 35 of each vane 34 to the closest point on the vertical blade 35 of the next adjacent vane 34. In conjunction with this approximately 1½ inch spacing between adjacent separator vanes 34, it was also critical for obtention of such new and improved dust that the air be supplied into the air separator at the velocity previously disclosed herein, and that the flapper-valved outlet at the lower portion of the air separator inner conical casing be maintained tightly closed except during periodic discharge of coarser zinc dust particles therefrom by opening of the valve of the outlet, also as previously disclosed herein.

Figure 9:
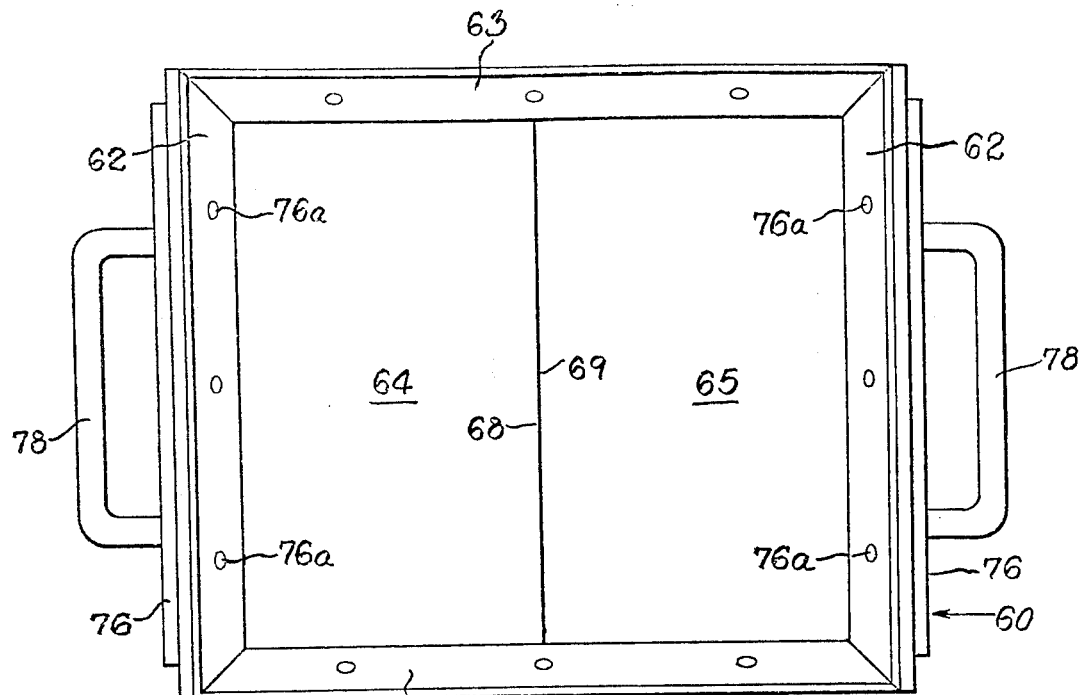
FIG. 9 is a top plan view of the receiving hoppervalved discharge outlet assembly of the air separator of the apparatus of this invention.
Figure 8:
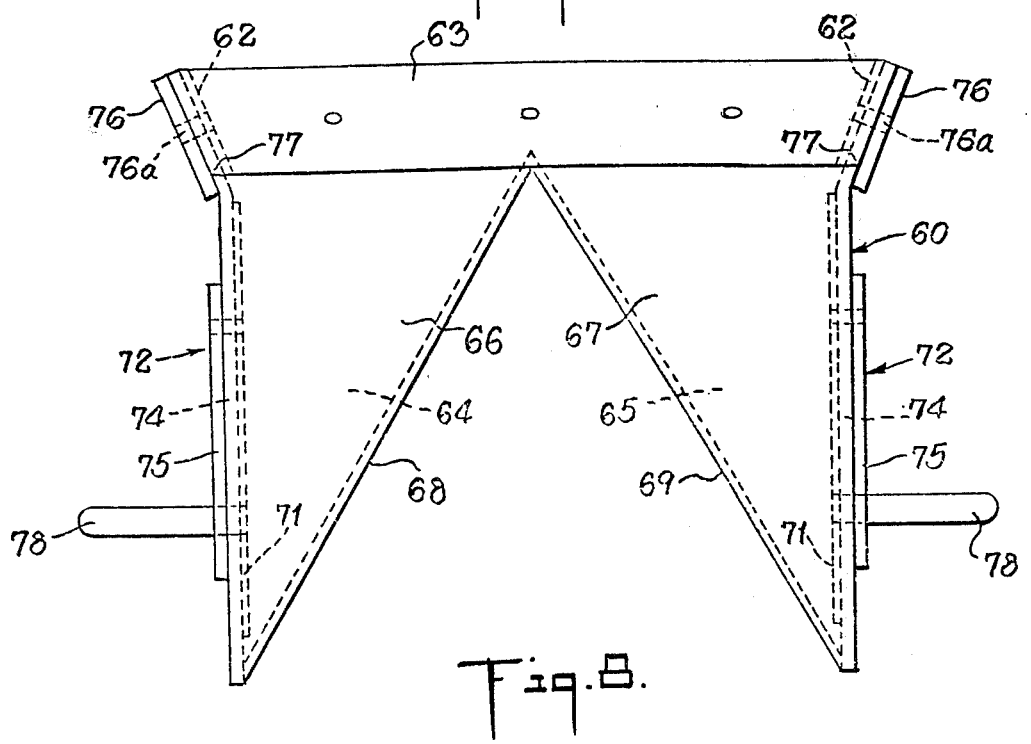
FIG. 8 is a vertical section through the flappervalved outlet of the inner conical casing of the air separator of the apparatus of this invention.

A receiving hopper-valved discharge outlet assembly 60, shown in detail in FIGS. 8 and 9, is detachably secured by screws 61 to the lower portion of inner casing 27 and forms a portion of or an extension of inner casing. This assembly has outwardly diverging end and side walls 62 and 63 respectively welded together to form the upper inlet portion of the assembly. Two generally V-shaped in section hoppers 64 and 65 for receiving the coarser zinc dust particles of diameters greater than 15 microns together with perhaps a relatively small amount of finer zinc particles or grains of diameters less than 15 microns are each formed of a pair of generally triangular shaped spaced apart side walls 66 and 67 welded to the upper side walls 63. Inner end walls 68 and 69 are welded to side walls 66 and 67 respectively and to upper side walls 63. Non-elastomeric sheets or plates 71, usually of a metal, for instance a ferrous metal, e.g. steel, form the inner part of the flapper valves 72 which tightly close off hoppers 64 and 65 until that time when the weight of the zinc dust particles accumulating therein exceeds the force holding the valves 72 tightly shut, the force holding the flapper valves 72 shut being the higher air pressure exteriorly of such valves 72 in the lower portion of the air separator laterally of and also beneath the flapper valves, than in the lower portion of the conical inner casing 27 and in hoppers 64 and 65. Sheets 71 may be omitted from flapper valves 72 although this is not preferred. Flapper valves 72 also include intermediate flexible elastomer flaps or sheets 74 covering and closing off (except when opened) the outer side portions and discharge outlets of hoppers 64 and 65, and outer non-elastomeric, rigid stiffening members or plates 75, usually of a metal such as for example, a ferrous metal, e.g. steel. Outer members 75 impart stiffness and mass to flapper valves 72 thereby aiding causing valves 72 to tightly close off the discharge outlets of hoppers 64 and 65 after the dust particles have passed therethrough. Any suitable elastomer is utilizable for forming flaps 74, including synthetic rubber and natural rubber. Outer stiffening plates 75, intermediate flexible flaps 74 and inner sheets 71 are secured together as a unit by screws extending through stiffening members 75, flexible flaps 74 and sheets 71 and also by an adhesive. Any suitable adhesive is utilizable for this purpose. Flexible flaps 74 extend over end walls 62 and are secured to end walls 62 and hinged at the upper portions of hoppers 64 and 65 at the loci designated 77 by ferrous metal plates 76 having screws 76a passing through registering apertures in metal plates 76, flexible flaps 74 and metal side walls 62. Members 78 welded to metal stiffening plates 75 are counterweights which aid in maintaining the flapper valves 72 in tightly closed position over the hopper discharge outlets.

The inner non-elastomeric plate-intermediate flexible elastomer flap-outer stiffening member sandwich assembly of flapper valves 72 was a considerable improvement over the prior flapper valves consisting solely of a sheet metal plate of ferrous metal with a leather hinge inasmuch as such sandwich assembly of the present flapper valves tightly closed off (except when in an opened position) the discharge outlets of hoppers 64 and 65 over a prolonged period of use. On the contrary the prior flapper valves consisting solely of a sheet metal plate with a leather hinge prematurely failed to tightly close off the discharge outlets of hoppers 64 and 65. Although it is not necessary that the closing off of the discharge outlets of hopper 64 and 65 by the flapper valves be air tight, it is essential that the discharge outlets be closed off sufficiently tightly to prevent the air current passing upwardly in the lower portion of the air separator and into annular passageway 33 from entering the hoppers 64 and 65 through their discharge outlets and passing into inner casing 27 to detrimentally affect, interfere with, or destroy the previously described, necessary double vortex in casing 27. The sandwich assembly flapper valves 72 perform this necessary tight closing off of the hopper discharge outlets as previously set forth herein.

Referring again to FIG. 1 and also FIG. 2, outlet 79 for the entraining air-finer zinc dust grain mixture is axially mounted in the upper portion of the air separator and has cylindrical side wall 80 having a flanged outer end portion welded to cover 31, cylindrical side wall 80 extending a short distance through an opening of slightly larger diameter in cover 31 to terminate within the separator slightly above the upper open end of inner casing 27. Inlet 81 for newly-incoming zinc dust is located in the lower portion of the air separator. Outlet 82 is for discharge of oversize, coarser zinc dust particles, which are the dust particles of particle size of 15 microns and larger when the separator vanes 34 are moved to and secured at an open position such that the spacing between adjacent vanes is about 1½ inches as previously disclosed herein, which spacing is essential to obtain the new and improved zinc dust having the particle size distribution of this invention. Outlet 82 is provided with a valve or airlock, shown in FIG. 1, for closing and, when the oversize dust particles are to be discharged, opening of the outlet. Inlet 83 for the fan-driven air is provided below dust feed inlet 81 and above oversize particles discharge outlet 82, inlet 83 having a flanged outer end portion.

As shown in FIG. 1, outlet 79 of the air separator is connected to the suction of fan or blower 85, and the outlet of blower 85 is connected to the inlet 86 of cyclone separator 87 by duct or conduit 94. Fan or blower 85 can be any suitable fan or blower and is readily obtainable in commerce. Cyclone 87 can be any suitable cyclone and is also readily obtainable in commerce. Cyclone separator 87 as shown has a cylindrical upper portion 88, a conical lower portion 89, and outlet duct or conduit 90 extending axially within the upper cylindrical portion and terminating at a level of the cyclone below inlet 86. Inlet 86 is tangentially arranged at the upper portion of cyclone 87. Hopper 91 for finished or product zinc dust is positioned directly beneath cyclone outlet 92 for the product zinc dust. Duct work or conduit 93 interconnects outlet conduit 90 of cyclone 87 and air inlet 83 of the air separator.

The apparatus of this invention is a closed or substantially closed system.

In operation, with reference to FIG. 1, zinc vapor from the distiller (not shown) of the zinc dust plant enters nozzle chamber 16 from vapor duct 15, and thence is passed into zinc condenser 17 of the zinc plant wherein it is condensed into zinc dust. The condensed dust falls to the bottom of condenser 17 wherein screw conveyor 18 moves the dust through the outlet of condenser 17 and into trommel screen 19, wherein the oversize dust particles of diameters larger than one-fourth inch are retained in the screen 19 and removed from its opposite end for remelting. The zinc dust particles of diameters of one-fourth inch and smaller pass through the openings of trommel screen 19 and fall into the trough of screw conveyor 20, which moves the dust into the trough of screw conveyor 21 which in turn charges the dust into inlet 81 of the air separator 23.

The zinc dust discrete particles, which comprises particles of a particle size or diameter of one-fourth inch and less than one-fourth inch and of varying size including zinc dust particles having a particle size of 15 microns and larger up to one-fourth inch, zinc dust grains having a grain size less than 10 microns, zinc dust grains having a grain size less than 5 microns and perhaps a small amount of zinc dust grains having a grain size less than 2 microns are entrained by the high velocity current or stream of fan-driven air introduced into inlet 83 of the separator 23 at a level below the locus of introduction of the zinc dust therein. The entraining air stream is flowing into the lower portion of the separator in an amount and at a velocity, typically 2670 feet/minute, which is sufficient to entrain the introduced zinc dust.

The air and entrained dust passes upwardly in the separator 23 through annular passageway 33 and through the spaces between the opened separator vanes 34 and within inner conical casing 27. The vertical blades 35, shown in FIG. 5, of the separator vanes 34 are set and fixed in an open position such that about 1½ inch spacings as hereinbefore disclosed are defined between the adjacent separator vane vertical blades 35 to obtain the new and improved zinc dust of the particle size distribution of this invention previously set forth herein. The effect of the vertical blades 35 of separator vanes 34 being set at the open position corresponding to the about 1½ inch spacing between the adjacent vanes blades 35, instead of being set at the usual open position corresponding to an about 2 9/16 inch spacing between adjacent vane blades 35, is to generate a greater pressure drop between the interior of inner casing 27 and the lower portion of the separator below the flapper valves 72 and to result in a higher velocity of the air entering into inner casing 27, as contrasted with a materially lower pressure drop between the inner casing interior and separator lower portion below the flapper valves 72 and a materially lower velocity of the air entering casing 27 when the blades 35 of the separator vanes were set at a more open position corresponding to the 2 9/16 inch spacing between adjacent blades 35. Due to such greater pressure drop and hence higher air velocity of the air entering inner casing 27, and with flapper valves 72 tightly closed, a greater cylonic action and centrifugal force was imparted to the air within inner casing 27. Consequently the zinc dust particles having a particle size of 15 microns and larger were caused to be thrown out of the air from an outer downwardly-moving vortex, whereas the zinc dust grains having a grain size smaller than 15 microns remained entrained in the air of the outer downwardly moving vortex and also remained entrained in the air of the inner upwardly moving vortex resulting from reversal of direction of the downwardly moving vortex, and such dust grains were sucked with the entraining air out of the air separator through outlet 79 by the suction produced by fan 85. The "thrown out" coarser zinc dust particles of 15 microns and larger particle size fall to the bottom of inner casing 27 and accumulate in hoppers 64 and 65. When the weight of the accumulated coarser dust particles in hoppers 64 and 65 reaches a predetermined value the normally closed flapper valves 72 open and the dust particles are dropped through the open flapper valves and recleaned, i.e. freed of smaller, desired size dust grains, by entrainment of the smaller grains in the rising air stream introduced into the separator lower portion through inlet 83. The oversize dust particles are then discharged or withdrawn from the separator through outlet 82 by opening a valve or airlock (not shown).

The entrained zinc dust grains of diameters less than 15 microns, which are sucked from the upper portion of the air separator 23 together with the entraining air by means of the suction produced by fan or blower 85, pass through the suction of fan 85, and thence through duct 94 and are introduced tangentially into cyclone 87. The entrained dust grains and gas whirl around at high velocity within the cyclone whereby the dust grains are separated from the air by centrifugal action and drop through outlet 92 into hopper 91. The finished or product zinc dust having a grain size distribution such that about 98% or more of the zinc grains have a grain size less than 15 microns and no more than about 3% of the zinc grains have a grain size less than 2 microns is packaged or otherwise disposed of or utilized by being withdrawn from hopper 91 by opening valve 95.

The cleaned air stream passes out of cyclone 87 through outlet duct 90 and is recycled through conduit 93 to inlet 83 in the lower portion of separator 23.

The zinc dust of this invention is useful in protective coating compositions or paints for protecting normally corrodible metals, e.g. ferrous metals, against corrosion, when mixed together with both organic and inorganic binders. Exemplary of the organic binders are epoxy resins, phenoxy resins, chlorinated rubber, styrene polymers, urethane polymers, vinyl polymers, and styrene-butadiene copolymers. Vegetable oil such as, for example, linseed oil is also exemplary of the organic binders or vehicles utilizable herein. The inorganic binders are exemplified by silicates such as, for example, ammonium silicates, Cellosolve silicates; lower alkyl silicates, i.e. 1–3 C alkyl silicates, e.g. ethyl silicate; alkali metal silicates, e.g. sodium silicate, lithium silicate, sodium lithium silicate and sodium potassium silicate; and phosphates, for example sodium dihydrogen phosphate and potassium dihydrogen phosphate. Solvents for the binder or non-solvents for the binder, and which can be organic or inorganic, and water-miscible or immiscible are usually also present together with the binder in the coating compositions herein. Exemplary of the solvents are organic solvent such as, for example, mineral spirits, xylene, a mixture of methyl isobutyl ketone, butanol and toluene; maphtha; and a mixture of methyl isobutyl ketone and xylene; and inorganic solvent such as water. Exemplary of the non-solvents are inorganic liquids such as water, and organic liquids such as methyl isobutyl ketone which is a non-solvent for certain binders such as high molecular weight epoxy resins and ethanol which is a non-solvent for certain binders such as chlorinated rubber. For coating steel strip, the zinc dust is combined with one of the organic binders to form the paint. For protective paints or coating compositions for coating marine and industrial structures, for instance bridges, pilings, tank farms, irrigation equipment, piers, etc., the zinc dust herein is combined with either an organic or inorganic binder to form the paint. Additionally the zinc dust herein is utilizable as a chemical reagent, for instance as a reducing agent.

The protective coating compositions of this invention usually contain the zinc dust of the present invention in amount, by weight, in the range of about 50 to about 95%. Such compositions may contain the binder in amount, by weight, in the range of about 50 to about 5%. When the binder is an organic binder, it may be present in the coating compositions in amount, by weight, in the range of about 5 to about 50%. Inorganic binder, when utilized, may be present in the coating composition herein in amount, by weight, in the range of about 5 to about 45%. Solvent or non-solvent for the binder may be present in the coating composition herein in amount, by weight, in the range of about 0 to about 50%. Solvent or non-solvent for the organic binder may be present in the coating composition herein in amount, by weight, in the range of about 0 to about 40%. Solvent or non-solvent for the inorganic binder may be present in the coating composition herein in amount, by weight, in the range of about 15 to about 50%.

Driers, anti-settling agents, pigments, film-curing aids, potlife-control additives, and converting agents are also utilizable in the coating compositins of this invention.

In preparing the protective coating compositions of this invention, the zinc dust of the invention is thoroughly mixed or dispersed into the binder or vehicle. The other constituents of the protective coating compositions, for instance the driers, anti-settling agents, pigments, film curing aids, potlife control additives or converting agents, are mixed together with the binder prior to or after mixing the zinc dust with the binder or vehicle, usually prior to mixing zinc dust with the binder.

The protective coating composition or paint of this invention is applied to the surface or surfaces of the normally corrodible metal, e.g. corrodible ferrous metal or ferrous metal alloys, for inhibiting corrosion of the surfaces by any suitable application method, for instance by spray coating, brushing, immersing or roller coating. If the surface or surfaces to be protected are not already clean or in suitable condition to be coated, they are cleaned or placed in such suitable condition prior to applying the coating composition thereto. The coating compositions of this invention are eminently well suited for protecting corrodible metal surfaces against corrosion where thin but effective protective films are required, and for this purpose is typically applied in a thickness of about 0.5 to 2 mils dry film thickness.

The following examples of protective coating compositions containing the zinc dust of this invention are illustrative only and are not restrictive.

| Example 1 | |
|---|---|
| | % by Weight |
| Phenoxy resin | 4.64 |
| Ketone-formaldehyde resin | 2.32 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 62.66 |
| Anti-settling agent | 0.60 |
| Organic solvent | 29.78 |

The organic solvent in Example 1 was a mixture of methyl isobutyl ketone, butanol and toluene in the weight ratio of 15:20:30 respectively. The anti-settling agent in Example 1 and in Examples 2–5 and 7–12 hereafter set forth is exemplified by a clay, e.g. a montmorillonite clay, silica gel, or a vegetable oil resin; and its function was to prevent settling out or caking of the zinc dust.

| Example 2 | |
|---|---|
| | % by Weight |
| Chlorinated rubber resin | 4.04 |
| Extender resin | 3.24 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 80.42 |
| Anti-settling agent | 0.30 |
| Xylene | 12.00 |

The extender resin in Example 2 was chlorinated paraffin.

| Example 3 | |
|---|---|
| | % by Weight |
| Styrene-butadiene copolymer | 6.7 |
| Zinc dust of this invention having a grain size distribution such that about 98% of the grains have a size less than 15 microns, about 94% of the grains have a size less than 10 microns, about 49% of the grains have | |

Example 3 -continued

| | % by Weight |
|---|---|
| a size less than 5 microns, and about 2% of the grains have a size less than 2 microns, and having a metallic zinc content of about 97% | 80.0 |
| Anti-settling agent | 0.2 |
| Cobalt drier (6%) | 0.2 |
| Mineral spirits | 12.9 |

Example 4

| | % by Weight |
|---|---|
| Epoxy ester resin, solids | 11.44 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 65.86 |
| Anti-settling agent | 0.50 |
| Cobalt driers (6%) | 0.07 |
| Super High Flash naphtha | 22.13 |

Example 5

| | % by Weight |
|---|---|
| Epoxy resin | 4.46 |
| Polyamide resin | 2.03 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 81.42 |
| Anti-settling agent | 0.36 |
| Organic solvent | 11.73 |

The organic solvent in Example 5 was a methyl isobutyl ketone xylene mixture in the weight ratio of 65:35 respectively.

Example 6

| | % by Weight |
|---|---|
| Raw linseed oil | 20.6 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 62.4 |
| Zinc oxide | 15.6 |
| Solvent and driers | 1.4 |

The solvent and driers in Example 6 were mineral spirits and a mixture of lead, cobalt and manganese naphthenates, respectively.

Example 7

| | % by Weight |
|---|---|
| Ethyl silicate (pre-hydrolyzed) | 49 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 50 |
| Anti-settling agent | 1 |

Example 8

| | % by Weight |
|---|---|
| Ethyl silicate (hydrolyzed) | 21.4 |
| Ethyl silicate (condensed) | 21.4 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 53.4 |
| Anti-settling agent | 2.7 |
| Converting agent | 1.1 |

The converting agent in Example 8 was ferric chloride and its function was to induce hydrolysis of the ethyl silicate by absorbing water from the atmosphere.

Example 9

| | % by Weight |
|---|---|
| Sodium silicate aqueous solution (26.72% solids, $SiO_2/Na_2O$ ratio of 4.63:1 respectively) | 21.7 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 77.0 |
| Anti-settling agent | 1.3 |

Example 10

| | % by Weight |
|---|---|
| Potassium silicate aqueous solution (25% solids, $SiO_2/K_2O$ ratio of 4.94:1 respectively) | 25.4 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 73.3 |
| Anti-settling agent | 1.3 |

Example 11

| | % by Weight |
|---|---|
| Lithium silicate aqueous solution (19.9% solids, SiO$_2$/Li$_2$O ratio of 8:1 respectively) | 35.5 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 63.5 |
| Anti-settling agent | 1.0 |

Example 12

| | % by Weight |
|---|---|
| Cellosolve silicate solution | 37.65 |
| Zinc dust of this invention having a grain size distribution such that about 98% of the grains have a size less than 15 microns, about 94% of the grains have a size less than 10 microns, about 49% of the grains have a size less than 5 microns, and about 2% of the grains have a size less than 2 microns, and having a metallic zinc content of about 97% | 68.99 |
| Anti-settling agent | 0.68 |
| Trimethyl borate | 0.68 |

The function of the anti-settling agent in Examples 1 through 12 is to maintain the zinc particles dispersed and to prevent settling out of the zinc to form a deposit on the bottom of the container holding the coating composition.

DESCRIPTION OF THE PREFERRED EMBODIMENTS

The zinc dust of this invention preferably has a grain size distribution such that about 98% or more of the grains have a grain size less than 15 microns, about 85 to about 93% of the grains have a grain size less than 10 microns, about 45 to about 55% of the grains have a grain size less than 5 microns, and no more than about 3% of the grains have a grain size less than 2 microns, the percentages being by weight.

An especially preferred zinc dust herein has a grain size distribution such that about 98% or more of the grains have a grain size less than 15 microns, about 93% of the grains have a grain size less than 10 microns, about 49% of the grains have a grain size less than 5 microns, and no more than about 2% of the grains have a grain size less than 2 microns, the percentages being by weight.

The generally sphereical zinc dust grains herein are free or substantially free of acicular protuberances extending from the grain surfaces. The presence of the acicular protuberances, which are composed predominately of zinc oxide, on the grain surfaces, which characterized certain of the prior art zinc dusts, is disadvantageous inasmuch as the acicular protuberances break off with consequent agglomeration of the acicular particles.

The particle or grain size distribution of the new and improved zinc dust of this invention was determined by the use of a Coulter Counter. The instrument was a conventional Coulter Counter, Model B, with a Model M data conversion unit and was obtained in commerce. The electrolyte utilized for the determination was a 3:1 by volume mixture of distilled water and reagent grade glycerol, with 30 g/l sodium chloride added to the mixture to attain the necesary conductivity. The thus-obtained electrolyte was filtered through a Millipore filter with a mean pore size of 1.2 microns, and then through a Millipore filter with a mean pore size of 0.2 micron. All filtering was done using a maximum vacuum of 15 inches Hg. The aperture impedance for a 100 micron tube using the filtered electrolyte was 20 k. The 100 micron aperture tube of the Coulter Counter was calibrated using mono-sized latex beads with a mean diameter of 3.49 microns. The instrument was calibrated using a matching switch setting of 64H and a grain control 60. The zinc dust sample was pre-dispersed in a small amount of the electrolyte on a watch glass, and this dispersion was then washed into a larger amount of the electrolyte contained in a 250 ml. round bottom beaker and dispersed for two minutes by means of a 100 watt ultrasonic bath. The zinc dust concentration was maintained between 10,000–20,000 particles or grains per ½ cc greater than the smallest measured size to minimize coincidence errors. Counting was done with the dual threshold technique and the data read using the Model M data conversion unit. The zinc dust was analyzed twice with one count proceeding from the coarse end of the distribution to the fine end, and one count proceeding from the fine end of the distribution to the coarse end. During counting the stirrer constantly agitated the electrolyte dispersion except for counts at the three settings of highest sensitivity; at this time the stirrer was shut off during counting to reduce background noise.

The air separator of the apparatus of this invention has the following typical dimensions: the uppermost cylindrical portion of the outer casing an inner diameter of about 4 feet 3 inches, the narrowest lower portion of the outer casing an inner diameter of about 10½ inches; the outlet in the upper portion for the entraining air-entrained zinc dust particle mixture a diameter of about 11.5 inches and a length of about 8 inches; the separator vane vertical blade a height of about 3 inches and a width of about 2⅞ inches, the slot aperture a length of about 1 5/16 inches and a width of about ⅛ inch, the fixed outer ring or annular member a width of about 15/16 inch, the moveable inner annular member a width of about 1¼ inch; the inner conical casing an inner diameter of about 3 feet 9 inches at its widest portion and an inner diameter of about 10 inches at its narrowest portion; the flapper valves 72 each have the dimensions: inner non-eleastomeric plate 71 length of about 7⅜ inches and width of about 4 inches, intermediate flexible elastomer sheet 74 length of about 8½ inches and width of about 7⅞ inches, and outer non-elastomeric stiffening plate 75 length of about 7⅜ inches and width of about 4 inches; the inner end walls 68 and 69 of the receiving hopper-valved discharge outlet assembly each have length of about 8⅜ inches and width of about 8 inches; and the top or uppermost end edge portion of the upper inlet portion of the receiving hopper-valved discharge outlet assembly has length of about 9⅝ inches and width of about 9⅝.

In another embodiment of the apparatus of this invention, the apparatus is that previously described herein but is not in combination with a zinc dust plant. Instead the zinc dust is supplied to the inlet therefor of the air separator from any other suitable zinc dust source, for instance from a storage container for the zinc dust, by means of a screw conveyor or other suitable conveying or supplying means.

What is claimed is:

1. In a protective coating composition comprising zinc dust and an organic binder, the improvement which comprises utilizing as the zinc dust in said composition, by weight, about 50 to about 95% of a zinc dust comprising generally spherical zinc dust grains and having a grain size distribution as determined by a Coulter Counter such that at least about 98% of the grains have a grain size less than 15 microns, about 85 to about 93% of the grains have a grain size less than 10 microns, about 45 to about 55% of the grains have a grain size less than 5 microns, and no more than about 3% of the grains have a grain size less than 2 microns, said dust having a metallic zinc content of about 95–98%.

2. The coating composition of claim 1 wherein about 93% of the grains have a grain size less than 10 microns, about 49% of the grains have a grain size less than 5 microns, and no more than about 2% of the grains have a grain size less than 2 microns.

3. The coating composition of claim 1 wherein the grains are substantially free of acicular protuberances extending from the grain surfaces.

4. The coating composition of claim 1 wherein the organic binder is contained therein in amount, by weight, in the range of about 5 to about 45%.

5. The coating composition of claim 1 also containing a solvent or non-solvent for the binder.

6. The coating composition of claim 5 containing a solvent for the binder.

7. The coating composition of claim 5 containing a non-solvent for the binder.

* * * * *

UNITED STATES PATENT OFFICE
CERTIFICATE OF CORRECTION

Patent No. 3,941,609          Dated March 2, 1976

Inventor(s)  Melvin Stern

It is certified that error appears in the above-identified patent and that said Letters Patent are hereby corrected as shown below:

Column 1, line 37, "show" should read --shows--. Column 3, line 55, --dust-- should be inserted after "zinc". Column 5, line 44, "flappervalved" should read --flapper-valved--. Column 11, line 16, "maphtha" should read --naphtha--. Column 13, line 44, "ketonexylene" should read -- ketone-xylene--. Column 15, line 55, "sphereical" should read --spherical--. Column 16, line 62, --inches-- should be inserted after "9 5/8" and before the period. Column 17, line 7, --%-- should be inserted after "50" and before "to"; line 11, --%-- should be inserted after "85"; line 13, --%-- should be inserted after "45" and before "to"; last line, "95" should read --96--. Column 18, line 11, --%-- should be inserted after "5" and before "to"; line 11, "45%" should read --50%--.

Signed and Sealed this

Fourteenth Day of September 1976

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,941,609      Dated March 2, 1976

Inventor(s) Melvin Stern

It is certified that error appears in the above-identified patent and that said Letters Patent are hereby corrected as shown below:

Column 1, line 32, "3,403,229" should read -- 3,423,229 --.

Signed and Sealed this

Fourteenth Day of December 1976

[SEAL]

Attest:

RUTH C. MASON
*Attesting Officer*

C. MARSHALL DANN
*Commissioner of Patents and Trademarks*